(12) United States Patent
Maioli et al.

(10) Patent No.: US 11,177,054 B2
(45) Date of Patent: Nov. 16, 2021

(54) ARMOURED CABLE FOR TRANSPORTING ALTERNATE CURRENT

(71) Applicant: Prysmian S.p.A., Milan (IT)

(72) Inventors: Paolo Maioli, Milan (IT); Massimo Bechis, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 17/136,718

(22) Filed: Dec. 29, 2020

(65) Prior Publication Data

US 2021/0217540 A1   Jul. 15, 2021

(30) Foreign Application Priority Data

Jan. 10, 2020 (IT) .................. 102020000000343

(51) Int. Cl.
*H01B 7/22* (2006.01)
*H01B 7/18* (2006.01)
(Continued)

(52) U.S. Cl.
CPC ........... *H01B 7/226* (2013.01); *H01B 7/1875* (2013.01); *H01B 9/006* (2013.01); *H01B 9/02* (2013.01)

(58) Field of Classification Search
CPC .......... H01B 7/14; H01B 7/26; H01B 17/226; H01B 17/1875; H01B 9/006; H01B 9/02; H01B 9/025
See application file for complete search history.

(56) References Cited

U.S. PATENT DOCUMENTS 3,679,812 A * 7/1972 Owens .................. H01B 7/292
 174/108
5,150,443 A * 9/1992 Wijnberg ............. G02B 6/4415
 385/107
(Continued)

FOREIGN PATENT DOCUMENTS

CN   104 103 352 A   10/2014
CN   107 731 402 A    2/2018
(Continued)

OTHER PUBLICATIONS

Search Report in corresponding Italian Application No. 202000000343, dated Jul. 2, 2020.
(Continued)

*Primary Examiner* — Hoa C Nguyen
*Assistant Examiner* — Amol H Patel
(74) *Attorney, Agent, or Firm* — Finnegan, Henderson, Farabow, Garrett & Dunner, L.L.P.

(57) ABSTRACT

The present disclosure relates to an armoured cable (10) for transporting alternate current comprising: at least one core (12), each core comprising an electric conductor (121); at least one metallic screen (126) surrounding the at least one core (12); an armour (16), surrounding the at least one metallic screen, comprising an inner layer (16a) of armour wires and an outer layer (16b) of armour wires, at least part of the armour wires of the inner layer (16a) and at least part of the armour wires of outer layer (16b) comprising a ferromagnetic material; and a separating layer between the inner layer (16a) of armour wires and the outer layer (16b) of armour wires. The separating layer has a thickness of at least 1 mm. The present disclosure also relates to a method for reducing losses in said armoured cable and to a method for improving the performances of said armoured cable.

10 Claims, 1 Drawing Sheet

(51) Int. Cl.
*H01B 9/00* (2006.01)
*H01B 9/02* (2006.01)

(56) References Cited

U.S. PATENT DOCUMENTS

| | | | | |
|---|---|---|---|---|
| 9,722,406 | B2* | 8/2017 | Manabe | H02G 1/10 |
| 9,947,437 | B2* | 4/2018 | Li | H01B 7/14 |
| 10,001,613 | B2* | 6/2018 | Varkey | E21B 43/26 |
| 10,056,171 | B2* | 8/2018 | Manabe | B32B 1/08 |
| 10,121,568 | B2* | 11/2018 | Saugrain | H01B 9/0611 |
| 2003/0024728 | A1* | 2/2003 | Yamamoto | H01B 11/203 |
| | | | | 174/113 R |
| 2007/0107928 | A1* | 5/2007 | Varkey | H01B 13/141 |
| | | | | 174/102 R |
| 2008/0236867 | A1* | 10/2008 | Varkey | H01B 7/046 |
| | | | | 174/115 |
| 2012/0097419 | A1* | 4/2012 | Varkey | H01B 13/06 |
| | | | | 174/106 R |
| 2014/0166335 | A1* | 6/2014 | Kagoura | H01B 7/2825 |
| | | | | 174/107 |
| 2015/0136440 | A1* | 5/2015 | Varkey | H01R 43/28 |
| | | | | 174/107 |
| 2015/0155073 | A1* | 6/2015 | Varkey | H01B 7/226 |
| | | | | 174/105 R |
| 2015/0170795 | A1 | 6/2015 | Maioli et al. | |
| 2016/0172077 | A1* | 6/2016 | Maioli | H01B 7/04 |
| | | | | 174/108 |
| 2018/0247736 | A1* | 8/2018 | Gogola | H01B 7/22 |
| 2019/0069453 | A1* | 2/2019 | Goodman | C08K 3/22 |
| 2019/0228876 | A1 | 7/2019 | Consonni et al. | |
| 2020/0123866 | A1* | 4/2020 | Varkey | D07B 1/147 |
| 2020/0135361 | A1* | 4/2020 | Tyrberg | H02G 1/10 |
| 2021/0210252 | A1* | 7/2021 | Varkey | H01B 7/1895 |

FOREIGN PATENT DOCUMENTS

| | | |
|---|---|---|
| EP | 1 124 236 A2 | 8/2001 |
| EP | 3 244 422 A1 | 11/2017 |
| GB | 2 189 071 A | 10/1987 |
| WO | WO 2013/174399 A1 | 11/2013 |
| WO | WO 2018/059685 A1 | 4/2018 |

OTHER PUBLICATIONS

International Standard IEC 60287-1-1 (Second Edition, 2006) (71 pages in both English and French).

* cited by examiner

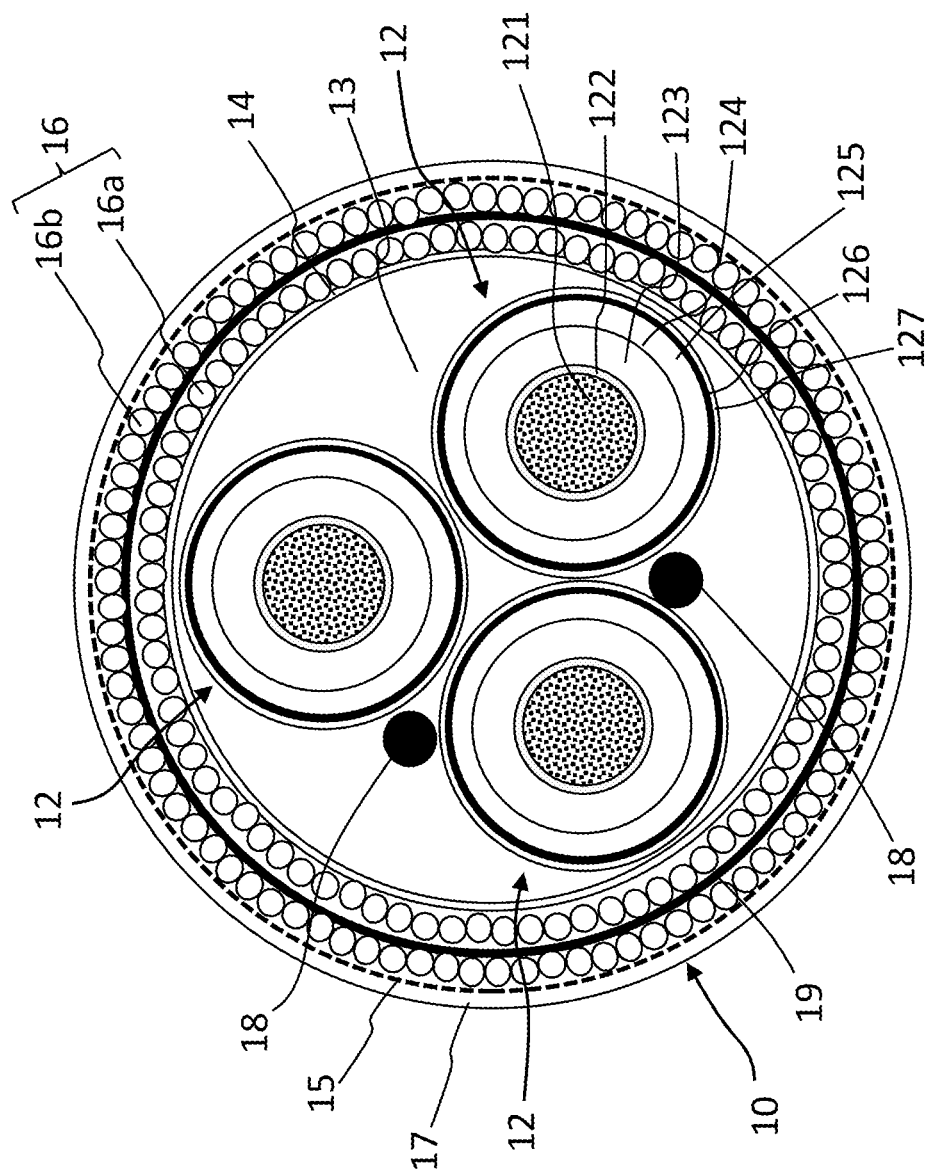

ARMOURED CABLE FOR TRANSPORTING ALTERNATE CURRENT

The present disclosure relates to an armoured electrical cable for transporting alternate current (AC). The disclosure also relates to a method for reducing losses in said armoured AC cable and to a method for improving the performances of said armoured AC cable.

An armoured cable is generally employed in applications (e.g. submarine application) where mechanical stresses are envisaged. In an armoured AC cable, a single core or multiple cores (usually three stranded cores, in the latter case) is/are surrounded by an armour in the form of metal wires, configured to strengthen the cable structure while maintaining a suitable flexibility. Each cable core generally comprises an electric conductor in the form of a rod or of stranded wires, an insulating system (usually comprising an insulating layer and at least one semiconducting layer) and a metallic screen. In case of multiple cores, the cores can be individually or collectively screened by the metallic screen.

CN 104103352 discloses an AC cable, in particular a double steel wire armoured optical fiber composite submarine cable. The armour comprises an inner steel layer, an outer steel layer and a fibre mat layer between the inner layer and outer layer of armour.

The Applicant noted that when alternate current is transported by a cable, the temperature of the electric conductors within the cable cores rises due to resistive losses, a phenomenon referred to as Joule effect.

The transported alternate current and the electric conductors are typically sized in order to guarantee that the maximum temperature in electric conductors is maintained below a prefixed threshold (e.g., below 90° C.) that guarantees the integrity of the cable.

The international standard IEC 60287-1-1 (second edition 2006-12, Par. 1.4.1.1) provides methods for calculating permissible current rating of cables from details of permissible temperature rise, conductor resistance, losses and thermal resistivities. In particular, the calculation of the current rating in electric cables is applicable to the conditions of the steady-state operation at all alternating voltages. The term "steady state" is intended to mean a continuous constant current (100% load factor) just sufficient to produce asymptotically the maximum conductor temperature, the surrounding ambient conditions being assumed constant. Formulae for the calculation of losses are also given.

In IEC 60287-1-1, the permissible current rating of an AC cable is derived from the expression for the permissible conductor temperature rise $\Delta\theta$ above ambient temperature $\theta_a$, wherein $\Delta\theta=-\theta_a$, $\theta$ being the conductor temperature when a current I is flowing into the conductor and $\theta_a$ being the temperature of the surrounding medium under normal conditions, at a situation in which cables are installed, or are to be installed, including the effect of any local source of heat, but not the increase of temperature in the immediate neighbourhood of the cables to heat arising therefrom. For example, the conductor temperature $\theta$ should be kept lower than about 90° C.

For example, according to IEC 60287-1-1, in case of buried AC cables where drying out of the soil does not occur or AC cables in air, the permissible current rating can be derived from the expression for the temperature rise above ambient temperature:

$$I = \left[ \frac{\Delta\theta - W_d \cdot [0.5 \cdot T_1 + n \cdot (T_2 + T_3 + T_4)]}{R \cdot T_1 + n \cdot R \cdot (1 + \lambda_1) \cdot T_2 + n \cdot R \cdot (1 + \lambda_1 + \lambda_2) \cdot (T_3 + T_4)} \right]^{0.5} \quad (1)$$

where:

I is the current flowing in one conductor (Ampere)

$\Delta\theta$ is the conductor temperature rise above the ambient temperature (Kelvin)

R is the alternating current resistance per unit length of the conductor at maximum operating temperature ($\Omega$/m);

$W_d$ is the dielectric loss per unit length for the insulation surrounding the conductor (W/m);

$T_1$ is the thermal resistance per unit length between one conductor and the sheath (K·m/W);

$T_2$ is the thermal resistance per unit length of the bedding between sheath and armour (K·m/W);

$T_3$ is the thermal resistance per unit length of the external serving of the cable (K·m/W);

$T_4$ is the thermal resistance per unit length between the cable surface and the surrounding medium (K·m/W);

n is the number of load-carrying conductors in the cable (conductors of equal size and carrying the same load);

$\lambda_1$ is the ratio of losses in the metallic screen to total losses in all conductors in that cable;

$\lambda_2$ is the ratio of losses in the armouring to total losses in all conductors in the cable.

In case of three-core cables and steel wire armour, the ratio $\lambda_2$ is given, in IEC 60287-1-1, by the following formula:

$$\lambda_2 = 1.23 \frac{R_A}{R} \left(\frac{2c}{d_A}\right)^2 \frac{1}{\left(\frac{2.77 R_A 10^6}{\omega}\right)^2 + 1} \quad (2)$$

where $R_A$ is the AC resistance of armour at maximum armour temperature ($\Omega$/m);

R is the alternating current resistance per unit length of conductor at maximum operating temperature ($\Omega$/m);

$d_A$ is the mean diameter of armour (mm);

c is the distance between the axis of a conductor and the cable centre (mm);

$\omega$ is the angular frequency of the current in the conductors.

The Applicant has observed that, in general, a reduction of losses in an armoured AC electric cable enables to increase the permissible current rating and, thus, to reduce the cross-section of the conductor(s) (thus, the cable size and the quantity of material necessary to make the cable) and/or to increase the amount of the current transported by the cable conductors (thus, the power carried by the cable).

Moreover, the Applicant has observed that a reduction of losses generally enables to reduce capitalization of losses during the lifetime (e.g. 25 years) of the armoured AC electric cable.

The Applicant investigated the losses in an armoured AC electric cable. In particular, the Applicant investigated the losses in an armoured AC electric cable, having two armour layers separated by a separating layer, when part of the wires or all of the wires of the armour layers is made of ferromagnetic material, which is economically appealing with respect to a non-ferromagnetic material like, for example, austenitic stainless steel.

The Applicant noted that there are losses related to the variable magnetic field generated by AC current transported by the electric conductors, which causes eddy currents in the metallic (or electrically conductive) layers surrounding the cores (like, for example, the metallic screen(s) and the ferromagnetic wires of the two armour layers) as well as magnetic hysteresis of the ferromagnetic wires of the two armour layers.

During investigations of the losses in the above mentioned armoured AC electrical cable, the Applicant observed that the cable losses, in particular the combined losses in the two armour layers and the metallic screen(s) (that is, the heat losses induced inside the metallic two armour layers and the screen(s) by the magnetic field generated by AC current transported by the electric conductors) are reduced when the thickness of the separating layer between the two armour layers is increased. The Applicant found that a significant reduction (e.g. up to about 3%) is obtained when the thickness of the separating layer is higher than 1 mm.

In a first aspect the present disclosure thus relates to an armoured cable for transporting alternate current comprising:

at least one core, each core comprising an electric conductor, at least one metallic screen surrounding the at least one core;

an armour surrounding the metallic screen, comprising an inner layer of armour wires and an outer layer of armour wires, at least part of the armour wires of the inner layer and at least part of the armour wires of outer layer comprising a ferromagnetic material; and a separating layer between the inner layer of armour wires and the outer layer of armour wires, wherein the separating layer has a thickness of greater than 1 mm.

In a second aspect, the present disclosure relates to a method for improving the performances of an armoured AC cable having cable losses when an alternate current I is transported, wherein the armoured AC cable comprises:

at least one core, each comprising an electric conductor having a cross section area X sized for operating the armoured AC cable to transport the alternate current I at a maximum allowable working conductor temperature θ, as determined by the cable losses;

at least one metallic screen surrounding the at least one core;

an armour surrounding the metallic screen, comprising an inner layer of armour wires and an outer layer of armour wires, at least part of the armour wires of the inner layer and at least part of the armour wires of outer layer comprising a ferromagnetic material, the cable losses including conductor losses, screen losses and armour losses;

a separating layer between the inner layer of armour wires and the outer layer of armour wires, the method comprising the steps of:

reducing combined losses in the at least one metallic screen and in the inner layer and outer layer of the armour by making the separating layer with a thickness greater than 1 mm;

sizing the cross section area X of each electric conductor with a reduced value, this reduced value being determined and made possible by the reduced combined losses, and/or rating the armoured AC cable at the maximum allowable working conductor temperature θ to transport said alternate current I with an increased value, this increased value being determined and made possible by the reduced combined losses.

In a third aspect, the present disclosure relates to a method of reducing losses in an armoured AC cable wherein an alternate current I is transported, the armoured AC cable comprising:

at least one core, each comprising an electric conductor (121);

at least one metallic screen surrounding the at least one core;

an armour surrounding the at least one metallic screen, comprising an inner layer of armour wires and an outer layer of armour wires, at least part of the armour wires of the inner layer and at least part of the armour wires of outer layer comprising a ferromagnetic material, the losses including conductor losses, screen losses and armour losses;

a separating layer between the inner layer of armour wires and the outer layer of armour wires, the method comprising the steps of:

reducing combined losses in the at least one metallic screen and in the inner layer and outer layer of the armour by making the separating layer with a thickness greater than 1 mm.

Thanks to the Applicant's finding that the combined losses in the two armour layers and the metallic screen(s) are reduced by increasing the thickness of the separating layer between the two armour layers, the performances of the armoured AC cable can be improved in terms of increased transported alternate current and/or reduced electric conductor cross section area X.

In the cable market, a cable is offered for sale or sold accompanied by indication relating to, inter alia, the amount of transported alternate current, the cross-section area X of the electric conductor/s, the maximum allowable working conductor temperature and capitalization of losses during the lifetime of the cable. Thanks to the Applicant's finding, an armoured AC cable according to the present disclosure can have a reduced cross section area X of the electric conductor/s with substantially the same amount of transported alternate current and maximum allowable working conductor temperature, or an increased amount of transported alternate current with substantially the same cross section area X of the electric conductor/s and maximum allowable working conductor temperature.

This enables to make an armoured AC cable with increased current capacity and/or to reduce the size of the conductors with consequent reduction of cable size, weight and cost.

Moreover, capitalization of losses during the lifetime of the cable according to the present disclosure is in any case reduced with respect to a same cable design under the same operation conditions.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and claims, the term "core" is used to indicate an electric conductor surrounded by an insulating layer and, optionally, at least one semiconducting layer. The core can be surrounded by a metallic screen, which—in its turn—surrounds the conductor, the insulating layer and the semiconducting layer/s.

In the present description and claims, the term "ferromagnetic" indicates a material which has a substantial susceptibility to magnetization by an external magnetizing field (the strength of magnetization depending on that of the applied magnetizing field), and which remains at least partially magnetized after removal of the applied field. For example, the term "ferromagnetic" indicates a material that, below a given temperature, has a relative magnetic permeability r in absolute value (i.e. $|\mu_r|$) significantly greater than 1, for example with $|\mu_r|$ greater than or equal to 100.

In the present description, the term "non-ferromagnetic" indicates a material that below a given temperature has a relative magnetic permeability in absolute value of about 1.

In the present description, the term "multiple" or "multi" indicates more than one.

In the present description and claims, the term "maximum allowable working conductor temperature" is used to indicate the highest temperature a conductor is allowed to reach in operation in a steady state condition, in order to guarantee integrity of the cable. The temperature reached by the cable in operation substantially depends on the overall cable losses, including conductor losses due to the Joule effect and dissipative phenomena. The losses in the armour and in the metallic screen(s) are another significant component of the overall cable losses.

In the present description and claims, the term "permissible current rating" is used to indicate the maximum current that can be transported in an electric conductor in order to guarantee that the electric conductor temperature does not exceed the maximum allowable working conductor temperature in steady state condition. Steady state is reached when the rate of heat generation in the cable is equal to the rate of heat dissipation from the surface of the cable, according to laying conditions.

In the present description and claims, the terms "armour winding direction" and "armour winding pitch" are used to indicate the winding direction and the winding pitch of the armour wires arranged in one armour layer.

In case of a multi-core armoured AC cable, in the present description and claims, the term "unilay" is used to indicate that the stranding of the cores and the winding of the wires of an armour layer have a same direction (for example, both left-handed or both right-handed), with a same or different pitch in absolute value.

In the present description and claims, the term "contralay" is used to indicate that the stranding of the cores and the winding of the wires of an armour layer have an opposite direction (for example, one left-handed and the other one right-handed), with a same or different pitch in absolute value.

In the present description and claims, the term "elongated cross section" is used to indicate the shape of the transversal cross section perpendicular to the longitudinal axis of the armour wire, said shape being oblong, elongated in one dimension.

The present disclosure, in at least one of the aforementioned aspects, can be implemented according to one or more of the following embodiments, optionally combined together.

The separating layer may be in the form of an extruded polymeric layer or polymeric or fabric tape/s, optionally foamed.

In an embodiment, the separating layer is based on a material having a thermal conductivity greater than 0.1 W/(m·K). In this way, heat dispersion is facilitated.

For example, the separating layer is made of polymeric material like for example polyester (e.g. polyethylene terephthalate (PET)) or polypropylene (PP). Natural fibre tapes, like Hessian tapes, are also suitable.

In an embodiment, the separating layer has a thickness of 3 mm at most. This upper limit is chosen in order to limit the overall diameter of the armored cable and to avoid a too thick separating layer that may lead to mechanical breathing (decrease/increase of the armour diameter) of the armour under traction force.

The separating layer may be made of multiple sheaths or tapes of a same material or different materials. However, in order to limit its compressibility (due, for example, to a air cushion between the multiple sheaths or tapes), the separating layer can be made of a single sheath/tape of a same material.

In an embodiment, the wires of the inner armour layer have an elongated cross section. In an embodiment, also the wires of the outer armour layer have an elongated cross section.

The elongated cross section of the armour wires can have a substantially rectangular shape.

Alternatively, the elongated cross section is substantially shaped as an annulus portion.

In a further embodiment, the elongated cross section is provided with a notch and a protrusion at the two opposing ends along the major axis, so as to improve shape matching of adjacent wires. The notch/protrusion interlocking among wires makes the armour advantageously firm even in case of dynamic cable.

In an embodiment, the elongated cross section of the armour wires has a minor axis from about 1 mm to about 7 mm long, for example, from 2 mm to 5 mm long.

In an embodiment, the elongated cross section of the armour wires has a major axis from 3 mm to 20 mm long, for example from 3 mm to 12 mm long.

In an alternative embodiment, the wires of the inner layer have a circular cross section (that is, they are round wires). In an embodiment, also the wires of the outer layer have a circular cross section (that is, they are round wires).

In an embodiment, in case of circular cross-section, the armour wires have an overall diameter of from 2 mm to 8 mm, for example of from 3 mm to 7 mm.

In an embodiment, the armour wires of the outer layer have substantially the same cross section in shape and, optionally, in size as those of the inner layer.

In a preferred embodiment, the armoured cable comprises multiple cores that are stranded together according to a core stranding lay and a core stranding pitch A.

In case of multiple cores, the at least one metallic screen may be a single metallic screen collectively screening the multiple cores or may be made of multiple metallic screens, each screening a respective core of the multiple cores.

In other words, each core may be screened by a respective metallic screen or the multiple cores may be collectively screened by a single metallic screen.

In an embodiment, the metallic screen consists of a non-ferromagnetic material. For example, the metallic screen consists of lead or copper.

Suitably, the armour surrounds all the multiple cores together, as a whole.

The wires of the inner layer and of the outer layer are wound around the multiple cores respectively according to a inner helical armour winding lay and an inner armour winding pitch B, and an outer helical armour winding lay and an outer armour winding pitch B'.

In an embodiment, the inner helical armour winding lay and the outer helical armour winding lay have opposite direction. This contralay configuration of the outer layer and inner layer is advantageous in terms of mechanical performances of the cable.

In an embodiment, in order to further reduce the combined losses in the screens and armour layers, the inner helical armour winding lay has a same direction as the core stranding lay, and the outer helical armour winding lay has an opposite direction with respect to the core stranding lay.

In an alternative embodiment, the inner helical armour winding lay has an opposite direction as the core stranding lay, and the outer helical armour winding lay has a same direction with respect to the core stranding lay.

In an embodiment, the inner armour winding pitch B is of from 0.4 to 3 the core stranding pitch A and differs from the core stranding pitch A by at least 10% of pitch A. The Applicant found that this relationship advantageously enables to further reduce armour losses.

In an embodiment, the inner armour winding pitch B≥0.5 A. For example, pitch B≥0.6 A. In an embodiment, pitch B≤3 A. For example, pitch B≤2.5 A.

In an embodiment, the outer armour winding pitch B' is higher, in absolute value, than the inner armour winding pitch B. For example, the outer armour winding pitch B' is higher, in absolute value, than B by at least 10% of B.

In an embodiment, all armour wires of the inner layer comprise a ferromagnetic material; for example all armour wires of the inner layer consist of ferromagnetic material.

In an embodiment, all armour wires of the outer layer comprise a ferromagnetic material; for example all armour wires of the outer layer consist of ferromagnetic material.

In an embodiment, the ferromagnetic material has a relative magnetic permeability r in absolute value greater than or equal to 100, for example of about 300 (that is, $|\mu_r|≥100$, e.g. $|\mu_r|=300$).

In an embodiment, the ferromagnetic material of the armour wires can comprise or consists of a material selected from: construction steel, ferritic stainless steel, martensitic stainless steel and carbon steel.

Besides the ferromagnetic armour wires, each of the inner layer and the outer layer of the armour can comprise further armour wires made of non ferromagnetic material. For example, said further armour wires could be made of polymeric material, optionally comprising glass, or stainless steel.

When the armoured cable comprises multiple cores, each of them is a single phase core.

The armoured cable can comprise three cores. The three-phase cable advantageously comprises three single phase cores.

In an embodiment, the armoured cable is a medium voltage or high voltage cable (MV or HV, respectively). The term medium voltage is used to indicate maximum voltages of from 1 to 36 kV. The term high voltage is used to indicate maximum voltages higher than 36 kV.

In an embodiment, the outermost diameter of the armoured cable is at least equal to 100 mm.

In an embodiment, the armoured cable has a rated current of at least 200 $A_{rms}$ or at least 300 $A_{rms}$; for example up to 800 $A_{rms}$ or 1000 $A_{rms}$.

The armoured power cable can be a submarine cable.

The features and advantages of the present disclosure will be made apparent by the following detailed description of some exemplary embodiments thereof, provided merely by way of non-limiting examples, description that will be conducted by making reference to the attached FIGURE. FIGURE schematically shows an exemplary armoured cable according an embodiment of the present disclosure.

In particular, FIGURE schematically shows an exemplarily armoured AC cable 10 for submarine application comprising three cores 12.

Each core 12 comprises a metal electric conductor 121, typically made of copper, aluminium or both, in form of a rod or of stranded wires. The conductor 121 is sequentially surrounded by an inner semiconducting layer 122, an insulation layer 123 and an outer semiconducting layer 124. The three layers 122, 123, 124 are made of polymeric material (for example, polyethylene), wrapped paper or paper/polypropylene laminate. In the case of the semiconducting layers 122, 124, the material thereof is charged with conductive filler such as carbon black.

Each conductor 121 has a cross section area X, wherein $X=\pi(d/2)^2$, d being the conductor diameter.

Outside the respective semiconducting layer 124, each core 12 also sequentially comprises a water blocking layer 125, a metallic screen 126 and a polymeric sheath 127 (the latter being made, for example, of MDPE, Medium Density Polyethylene).

The metallic screen 126 can be made, for example, of lead, generally in form of an extruded layer, or of copper, in form of a longitudinally wrapped foil, of wounded tapes or of braided wires.

The three cores 12 are helically stranded to one another according to a core stranding pitch A.

The three cores 12 are kept in place by a filler 13, which can be in form of extruded polymeric material, polymeric or natural yarn or plastic shaped filler (as disclosed, for example in EP3244422). If needed, one or more optical cables 18 (two, in the present case) can be provided within the filler 13.

The three cores 12 are surrounded, as a whole, by a bedding 14. The bedding 14 may be made from fabric tapes (e.g. Hessian tapes) or polypropylene (PP) textile.

Around the bedding 14 an armour 16 is provided. The bedding 14 protects the underlying surface from undue located pressure from the armour 16.

The armour 16 is surrounded by a textile protection layer 15 (made, for example, of PP textile) and a protective jacket 17 (made, for example, of MDPE).

The armour 16 comprises an inner layer 16a of armour wires and an outer layer 16b of armour wires. In FIGURE, the armour wires are depicted as having a round cross-section but this is to be intended as merely an illustrative example as the wires can have, alternatively, an elongated cross section; in particular, the wires 16a, 16b can be flat rods with a substantially rectangular cross-section.

A separating layer 19 is provided radially between the inner layer 16a of armour wires and the outer layer 16b of armour wires.

According to the present disclosure, the separating layer has a thickness greater than 1 mm.

In an embodiment, the separating layer has a thickness lower than or equal to 3 mm.

All the armour wires (or at least part thereof) of the inner layer 16a and of the outer layer 16b comprise ferromagnetic material; in an embodiment all of them (or at part of them) consist of ferromagnetic material.

The ferromagnetic material has, for example, a relative magnetic permeability r in absolute value equal to 300 (i.e. $|\mu_r|=300$) and may consist, for example, of construction steel.

The metal wires of the inner layer 16a and of the outer layer 16b are wound around the cores 12 respectively according to a inner helical armour winding lay and an inner armour winding pitch B, and an outer helical armour winding lay and an outer armour winding pitch B'.

The inner helical armour winding lay and the outer helical armour winding lay have opposite direction. This contralay configuration of the outer layer and inner layer is advantageous in terms of mechanical performances of the cable.

During development activities performed to investigate the losses in an AC electric power cable, the Applicant tested an AC three single-phase HV cable having the following structural and operational features:

TABLE 1

| Element | Diameter (mm) | Material | Notes |
|---|---|---|---|
| Core | | | |
| Conductor | 23.5 | Copper | Round strand Nominal section: 400 mm² Rated current: 470 $A_{rms}$ Rated voltage: U = 132 KV Frequency of 50 Hz |
| Insulation + semiconductive layers | 70.43 | XLPE | |
| Water blocking layer | 72.75 | Water-swellable tapes | |
| Metallic screen | 73.78 | Copper | |
| Polymeric sheath | 84.48 | MDPE | |
| Cable assembly | | | |
| Three-core assembly | 182.1 | | Pitch A = 1763.62 mm Laying direction: Z (right-handed) |
| Bedding | 187.54 | PP textile | |
| Inner layer of armour | 194.14 | Ferromagnetic galvanized steel | Flat wires 3.3 × 12 mm No. of wires (Nw1): 48 Pitch B = 3858 mm Laying direction: Z |
| Separating layer | 195.14 | PET tape | Thickness as in Table 3 |
| Outer layer of armour | 201.74 | Ferromagnetic galvanized steel | Flat wires 3.3 × 12 mm No. of wires (Nw2): 50 Pitch B' = 4012 mm Laying direction: S (left-handed) |
| Textile protection layer | 209.88 | PP textile | |
| Polymeric jacket | 220.88 | MPDE | |

The physical behaviour of metal materials in the metallic layers of the cable is described below in terms of electrical resistivity and relative magnetic permeability.

TABLE 2

| | Conductor | Metallic screen | Armour wires |
|---|---|---|---|
| Material | copper | copper | Ferromagnetic galvanized steel |
| Electrical resistivity $\rho_{20}$ at 20° C. (Ω*m) | 2.03*10⁻⁸ | 1.8*10⁻⁸ | 20.8*10⁻⁸ |
| Temperature coefficient α (1/° C.) | 3.93*10⁻³ | 3.93*10⁻³ | 4.5*10⁻³ |
| Working temperature (° C.) | 85 | 77.8 | 73.7 |
| Relative magnetic permeability $\mu_r$ | 1 | 1 | $\mu_r = \|\mu_r\| * e^{-i\phi}$ $\|\mu_r\| = 300$ $\phi = \pi/3$ |

The electrical resistivity of metal materials can be evaluated at the working temperature $T_w$ with the known formula:

$$\rho(T_w) = \rho_{20} * [1 + \alpha * (T_w - 20)]$$

Considering this cable as a starting point, the Applicant computed the armour losses in the inner layer and outer layer, the losses in the screens and the combined losses in the armour layers and screens, by using a 3D FEM (Finite Element Method) model that enables a comprehensive description of the electromagnetic phenomena that occur inside the cable. For example, the 3D FEM method may be that described in Sturm S. et al., "Estimating the Losses In Three-Core Submarine Power Cables Using 2D And 3D FEA Simulations", Jicable'15, 2015.

The computed losses are shown in Table 3 below.

TABLE 3

| | | Losses (W/m) | | | | |
|---|---|---|---|---|---|---|
| Case no. | Short description | screens | Inner layer of armour | Outer layer of armour | Over-all* | Δ** (%) |
| 1a | Z-Z-S Separating layer thickness = 0.5 mm | 16.23 | 1.02 | 1.72 | 18.97 | — |
| 1b | Z-Z-S Separating layer thickness = 1.5 mm | 16.15 | 0.65 | 1.83 | 18.63 | −1.79 |
| 1c | Z-Z-S Separating layer thickness = 2.4 mm | 16.10 | 0.56 | 1.84 | 18.50 | −2.48 |
| 2a | Z-S-Z Separating layer thickness = 0.5 mm | 16.84 | 1.86 | 0.46 | 19.16 | — |
| 2b | Z-S-Z Separating layer thickness = 1.5 mm | 16.56 | 2.04 | 0.38 | 18.98 | −0.94 |
| 2c | Z-S-Z Separating layer thickness = 2.4 mm | 16.44 | 2.13 | 0.35 | 18.92 | −1.25 |

*Combined screens + armour layers losses
**[Overall losses for case 1a(2a) − Overall losses for case 1b or 1c (2b or 2c)]/Overall losses for case 1a(2a)

In Table 3 above, cases 1a and 2a relate to two comparative configurations of the cable structure of Table 1 and a separating layer thickness of 0.5 mm. Cases 1b, 1c, 2b, 2c relate to the cable structure of Table 1 wherein the separating layer thickness is equal to 1.5 mm or 2.4 mm, according to the present disclosure.

Moreover, cases 2a, 2b, 2c reflect the cable structure of Table 1 apart from the fact that the laying direction of the inner layer of the armour is S (that is, contralay with respect to the stranding direction Z of the cores) while the laying direction of the outer layer of the armour is Z (that is, unilay with respect to the stranding direction Z of the cores).

Compared to cases 1a and 2a, the increased thickness of the separating layers in cases 1b, 1c, 2b, 2c is accompanied by an increased number of wires in the armour outer layer (and by an increase of the outer diameter as well). Accordingly, a greater amount of ferromagnetic metallic material could potentially increase the losses. However, as from the results set forth in Table 3, a reduction of the combined losses is anyway achieved by increasing the thickness of the separating layer.

The results of Table 3 also show that an increased thickness of the armour separating layer reduces the losses in the screens as well. This reduction in the screen losses is advantageous because, being the screens in a more central position in the cable, the heat losses induced therein are more difficult to dissipate with respect to the heat losses induced in the surrounding armour layers.

In addition, the results of Table 3 show that, in general, the combined losses in the screens and armour layers are lower in a cable wherein the inner layer of armour is unilay with respect to the stranding direction of the cores (Cases 1a-1c), with respect to a cable wherein the inner layer of armour is contralay with respect to the stranding direction of the cores (Cases 2a-2c).

As stated above, the reduction of the combined losses in the screens and armour layers, achieved thanks to the use of a separating layer of an increased thickness between the inner layer and outer layer of the armour, enables to increase the permissible current rating of a cable. The rise of permissible current rating leads to two improvements in an AC transport system: increasing the current transported by a power cable and/or providing a power cable with a reduced electric conductor cross section area X, the increase/reduction being considered with respect to the case wherein the armour losses are instead computed with a cable having a separating layer of a lower thickness.

This enables to make a cable more powerful and/or to reduce the size of the electric conductors with consequent reduction of cable size, weight and cost.

It is noted that, even if in the above description and FIGURE, cables comprising an armour with two layers of armour wires have been described, the present disclosure also applies to cables wherein the armour comprises more than two layers, radially superimposed.

In such cables, the multiple-layer armour can comprise the inner layer of wires and the outer layer of wires, surrounding the inner layer, as described above, and one or more further layers surrounding the outer layer, with a separating layer between each layer and the radially external one.

As to the further armour layer/s possibly surrounding the outer layer, the alternation unilay/contralay should be maintained, with a separating layer between each radially adjacent layers.

What is claimed is:

1. An armoured cable for transporting alternate current comprising:
   at least one core, each core comprising an electric conductor;
   at least one metallic screen surrounding the at least one core;
   an armour surrounding the metallic screen, comprising an inner layer of armour wires and an outer layer of armour wires, at least part of the armour wires of the inner layer and at least part of the armour wires of outer layer comprising a ferromagnetic material; and
   a separating layer between the inner layer of armour wires and the outer layer of armour wires,
   wherein the separating layer has a thickness greater than 1 mm.

2. The armoured cable according to claim 1, wherein the separating layer is based on a material having a thermal conductivity greater than 0.1 W/(m·K).

3. The armoured cable according to claim 1, wherein the separating layer has a thickness of 3 mm at most.

4. The armoured cable according to claim 1, wherein the armour wires of the inner layer and of the outer layer have an elongated cross section.

5. The armoured cable according to claim 1, wherein the armour wires of the inner layer and of the outer layer have a circular cross section.

6. The armoured cable according to claim 1, wherein the armour wires of the inner layer are wound around at least two cores according to a inner helical armour winding lay and the armour wires of the outer layer are wound around the at least two cores according to an outer helical armour winding lay, the inner helical armour winding lay and the outer helical armour winding lay having opposite direction.

7. The armoured cable according to claim 1, wherein the armour wires of the inner layer are wound around at least two cores according to a inner helical armour winding lay and the least two cores are stranded together according to a core stranding lay, the inner helical armour winding lay having a same direction as the core stranding lay.

8. The armoured cable according to claim 1, wherein the separating layer is made of polymeric material or of natural fibres.

9. A method for improving the performances of an armoured AC cable having cable losses when an alternate current I is transported, wherein the i armoured AC cable comprises:
   at least one core, each comprising an electric conductor having a cross section area X sized for operating the armoured AC cable to transport the alternate current I at a maximum allowable working conductor temperature $\theta$, as determined by the cable losses;
   at least one metallic screen surrounding the at least one core;
   an armour surrounding the at least one metallic screen, comprising an inner layer of armour wires and an outer layer of armour wires, at least part of the armour wires of the inner layer and at least part of the armour wires of outer layer comprising a ferromagnetic material, the cable losses including conductor losses, screen losses and armour losses;
   a separating layer between the inner layer of armour wires and the outer layer of armour wires;
   the method comprising the steps of:
   reducing combined losses in the at least one metallic screen and in the inner layer and outer layer of the armour by making the separating layer with a thickness greater than 1 mm;
   sizing the cross section area X of each electric conductor with a reduced value, this reduced value being determined and made possible by the reduced combined losses, and/or
   rating the armoured AC cable at the maximum allowable working conductor temperature $\theta$ to transport said alternate current I with an increased value, this increased value being determined and made possible by the reduced combined losses.

10. A method of reducing losses in an armoured AC cable wherein an alternate current I is transported, the armoured AC cable comprising:
    at least one core, each comprising an electric conductor;
    at least one metallic screen surrounding the at least one core;
    an armour surrounding the at least one metallic screen, comprising an inner layer of armour wires and an outer layer of armour wires, at least part of the armour wires of the inner layer and at least part of the armour wires of outer layer comprising a ferromagnetic material, the losses including conductor losses, screen losses and armour losses;
    a separating layer between the inner layer of armour wires and the outer layer of armour wires;
    the method comprising the steps of:
    reducing combined losses in the at least one metallic screen and in the inner layer and outer layer of the armour by making the separating layer with a thickness greater than 1 mm.

* * * * *